(12) United States Patent
Pal et al.

(10) Patent No.: US 8,463,021 B2
(45) Date of Patent: Jun. 11, 2013

(54) FOUR DIMENSIONAL RECONSTRUCTION AND CHARACTERIZATION SYSTEM

(75) Inventors: Anupam Pal, Kanpur (IN); Sreerup Banerjee, Behala (IN); Sudeepa Dixit, Burlington (CA)

(73) Assignee: Indian Institute of Technology Kanpur, Kanpur (IN)

( * ) Notice: Subject to any disclaimer, the term of this patent is extended or adjusted under 35 U.S.C. 154(b) by 351 days.

(21) Appl. No.: 12/883,649

(22) Filed: Sep. 16, 2010

(65) Prior Publication Data

US 2012/0070068 A1  Mar. 22, 2012

(51) Int. Cl.
*G06K 9/00* (2006.01)
(52) U.S. Cl.
USPC .......................................................... 382/154
(58) Field of Classification Search
USPC ................... 382/128, 131, 173, 154; 345/419
See application file for complete search history.

(56) References Cited

U.S. PATENT DOCUMENTS

| | | | | |
|---|---|---|---|---|
| 7,075,661 B2 * | 7/2006 | Petty et al. | | 356/603 |
| 7,623,702 B2 * | 11/2009 | Arata et al. | | 382/154 |
| 7,693,563 B2 | 4/2010 | Suresh et al. | | |
| 2006/0142984 A1 * | 6/2006 | Weese et al. | | 703/11 |
| 2007/0116338 A1 | 5/2007 | Fidrich et al. | | |
| 2010/0310146 A1 * | 12/2010 | Higgins et al. | | 382/131 |

FOREIGN PATENT DOCUMENTS

EP  2075763  7/2009

OTHER PUBLICATIONS

Poon, et al. "Efficient interactive 3D livewire segmentation of complex objects with arbitrary topology", pp. 640-650, 2008.*
Boykov, Y. et al., "Interactive Organ Segmentation using Graph Cuts," MICCAI, 2000, pp. 276-286.
Cohen, L. D., "On Active Contour Models and Balloons," CVGIP, Mar. 1991, pp. 1-18.
Cong, G. et al., "An Algebraic Solution to Surface Recovery from Cross-Sectional Contours," Graphical Models and Image Processing, No. 61, 1999, pp. 222-243.
Hamarneh, G. et al., "3D Live-Wire-Based Semi-Automatic Segmentation of Medical Images," Proc. of SPIE, vol. 5747, 2005, pp. 1597-1603.
Hasegawa-Johnson, M. et al., "CTMRedit: a Matlab-Based Tool for Segmenting and Interpolating MRI and CT Images in Three Orthogonal Planes," IN, 2009, 1 page.
Hinshaw, K. et al., "Shape-based models for interactive segmentation of medical images," SPIE Medical Imaging, 1995, 10 pages.

(Continued)

*Primary Examiner* — Daniel Mariam
(74) *Attorney, Agent, or Firm* — Foley & Lardner LLP

(57) ABSTRACT

A method and apparatus for performing a four-dimensional image reconstruction. The apparatus can be configured to receive a first input to slice a stack of two-dimensional images that depicts an object of interest into one or more planes to form one or more virtual images and receive a second input to segment the virtual images. One or more seed points can be generated on the virtual images based on the second input and to automatically order the seed points using a magnetic linking method. Contours corresponding to the object of interest can be generated using a live-wire algorithm and perform a first three-dimensional construction of the object of interest based on the contours. The contours can be converted into seed points for a subsequent set of images and perform a second three-dimensional construction of the object of interest corresponding to the subsequent set of images.

20 Claims, 11 Drawing Sheets

OTHER PUBLICATIONS

Liu et al., "Study and Application of Medical Image Visualization Technology," LNCS, vol. 4561, 2007, 2 pages. (Abstract only).

Lu, K. et al., "Interactive segmentation based on the live wire for 3D CT chest image Cars," Int. J CARS, vol. 2, 2007, pp. 151-167.

Mortensen, E. et al., "Interactive Segmentation with Intelligent Scissors," Graphical Image Processing, vol. 60, 1998, pp. 349-384.

Wikipedia, "Livewire Segmentation Technique" (http://en.wikipedia.org/wiki/Livewire_Segmentation_Technique), last modified on Aug. 26, 2009, pp. 1-2.

Yushkevich et al., "User-guided 3D active contour segmentation of anatomical structures: Significantly improved efficiency and reliability," NeuroImage, vol. 31, 2006, pp. 1116-1128.

* cited by examiner

FOUR DIMENSIONAL RECONSTRUCTION AND CHARACTERIZATION SYSTEM

BACKGROUND

The following description is provided to assist the understanding of the reader. None of the information provided or references cited is admitted to be prior art.

The functioning of the human body is inherently linked to anatomy and to the present status of internal organs. Imaging plays a critical role in assessing anatomical abnormalities which can lead to functional impairment. Certain imaging modalities allow for non-invasive examination and analysis of internal organs and abnormalities. Examples of non-invasive imaging methods include X-ray, Magnetic Resonance Imaging (MRI), ultrasonography, etc. In contrast, more invasive methods of examining internal organs include endoscopy, colonoscopy etc.

Since any physical object lies in three-dimensions (3-D) it is important to visualize them in 3-D. However, most non-invasive medical imaging techniques provide either a two-dimensional (2-D) projection or 2-D cross-sectional image. To obtain 3-D images from 2-D images requires significant processing which is typically time-consuming and tedious, thus greatly restricting the use of 3-D images in real-life settings. The problem becomes even more pressing when the 3-D structure changes with time, as in many internal organs, making data four-dimensional (4-D).

SUMMARY

The present technology provides an illustrative apparatus that includes and interface that is communicatively coupled to a processor. The interface is configured to receive a first input to slice a stack of two-dimensional images that depicts an object of interest into one or more planes to form one or more virtual images in any arbitrary orientation. The interface is further configured to receive a second input to segment the virtual images. The processor is configured to generate one or more seed points on the virtual images based on the second input and to automatically order the seed points using a magnetic linking method. The processor is further configured to generate contours corresponding to the object of interest using a live-wire algorithm and perform a first three-dimensional construction of the object of interest based on the contours. In addition, the processor is further configured to convert the contours into seed points for a subsequent set of images and perform a second three-dimensional construction of the object of interest corresponding to the subsequent set of images.

The present technology further provides an illustrative method that includes receiving a first input to slice a stack of two-dimensional images that depict an object of interest into one or more planes to form one or more virtual images and receiving a second input to segment the virtual images in any arbitrary orientation. The method further includes generating one or more seed points on the virtual images based on the second input and automatically ordering the seed points using a magnetic linking method. The method also includes generating contours corresponding to the object of interest using a live-wire algorithm, performing a first three-dimensional construction of the object of interest based on the contours, converting the contours into seed points for a subsequent set of images, and performing a second three-dimensional construction of the object of interest corresponding to the subsequent set of images.

The present technology further provides an illustrative article of manufacture that includes a tangible computer-readable medium having instructions stored thereon that, if executed by a computing device, cause the computing device to perform various operations. The operations include receiving a first input to slice a stack of two-dimensional images that depict an object of interest into one or more planes to form one or more virtual images and receiving a second input to segment the virtual images in any arbitrary orientation. The operations further include generating one or more seed points on the virtual images based on the second input and automatically ordering the seed points using a magnetic linking method. The operations also include generating contours corresponding to the object of interest using a live-wire algorithm, performing a first three-dimensional construction of the object of interest based on the contours, converting the contours into seed points for a subsequent set of images, and performing a second three-dimensional construction of the object of interest corresponding to the subsequent set of images.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
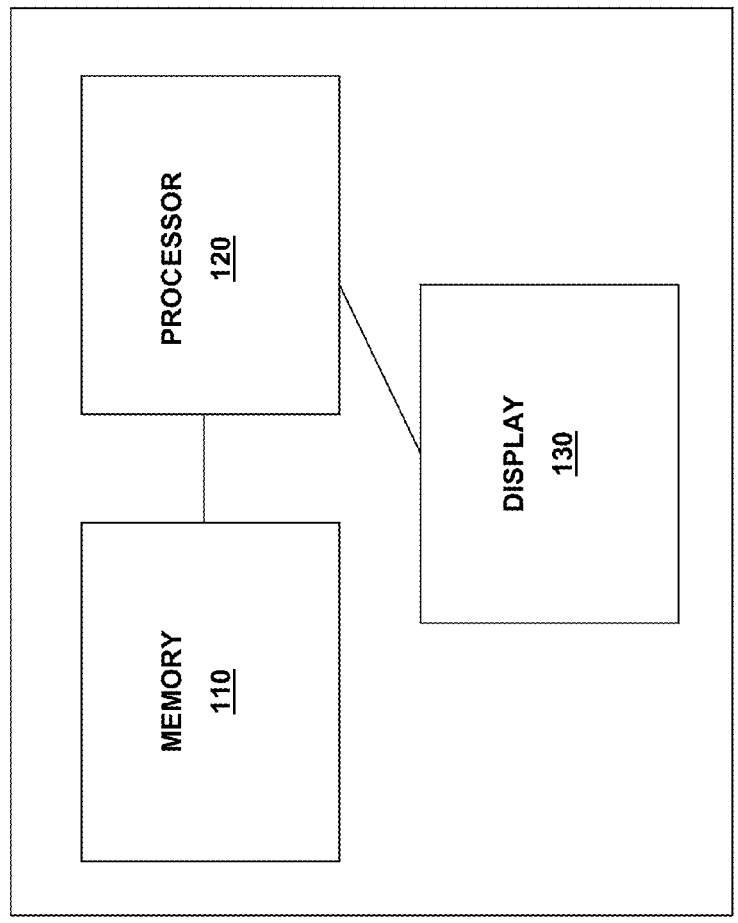
FIG. 1 depicts a block diagram of a device for operating a four-dimensional image reconstruction system in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The process of 3-D reconstruction and detailed quantification has a few key challenges. Since traditional 2-D images include multiple organs, in order to focus on a specific organ, the region of interest needs to be separated from the rest of the image, a step known as segmentation. Traditional segmentation techniques require a large amount of user intervention. For example, manual edge detection techniques require the user to manually draw the edges at every 2-D slice of the image, which is tedious, time-consuming, and introduces human error. Semi-automatic segmentation techniques generally require at least two or more inputs from the user for each 2-D image, depending on the complexity of the edges to be detected. In order to generate a 3-D image, numerous 2-D images are required, thus making multiple inputs for each 2-D image again tedious and time-consuming.

Following image segmentation, the contours of the segmented organ need to be stacked and a 3-D surface needs to be reconstructed. Finally, the complex anatomical 3-D images and functional 4-D images (3-D in space plus time) must be analyzed and parameterized to describe the structure and function of the object of interest in simple, yet meaningful terms. Typically these challenges are met with significant user intervention, which together with large volumes of data, make 3-D analysis of dynamic images a very time and resource consuming process, thus leading to limited use of the technology.

The present system allows for easy and efficient reconstruction of 3-D objects from 2-D images, thus reducing the resources and required processing time. As a result, the present system allows for an easier and more rapid accumulation of 4-D data and images.

FIG. 1 depicts a block diagram of a device 100 for operating a four-dimensional image reconstruction system in accordance with an illustrative embodiment. Device 100 includes a memory 110 that is configured to store instructions to perform various functions. Memory 110 may comprise any computer-readable medium known in the art that is capable of storing computer-executable instructions. For example, memory 110 may include, but is not limited to, temporary storage devices such as random access memory (RAM), permanent storage devices such as read-only memory (ROM), removable drives, hard drives, or any other type of computer-readable memory known to those of skill in the art. Device 100 further includes a processor 120 that is configured to receive inputs from a user, execute the instructions stored on memory 110, and cause a graphical user interface (GRAPHICAL USER INTERFACE) to be presented on display 130 according to the executed instructions and the inputs received from the user. In an embodiment, device 100 is a personal computer.

Figure 2:
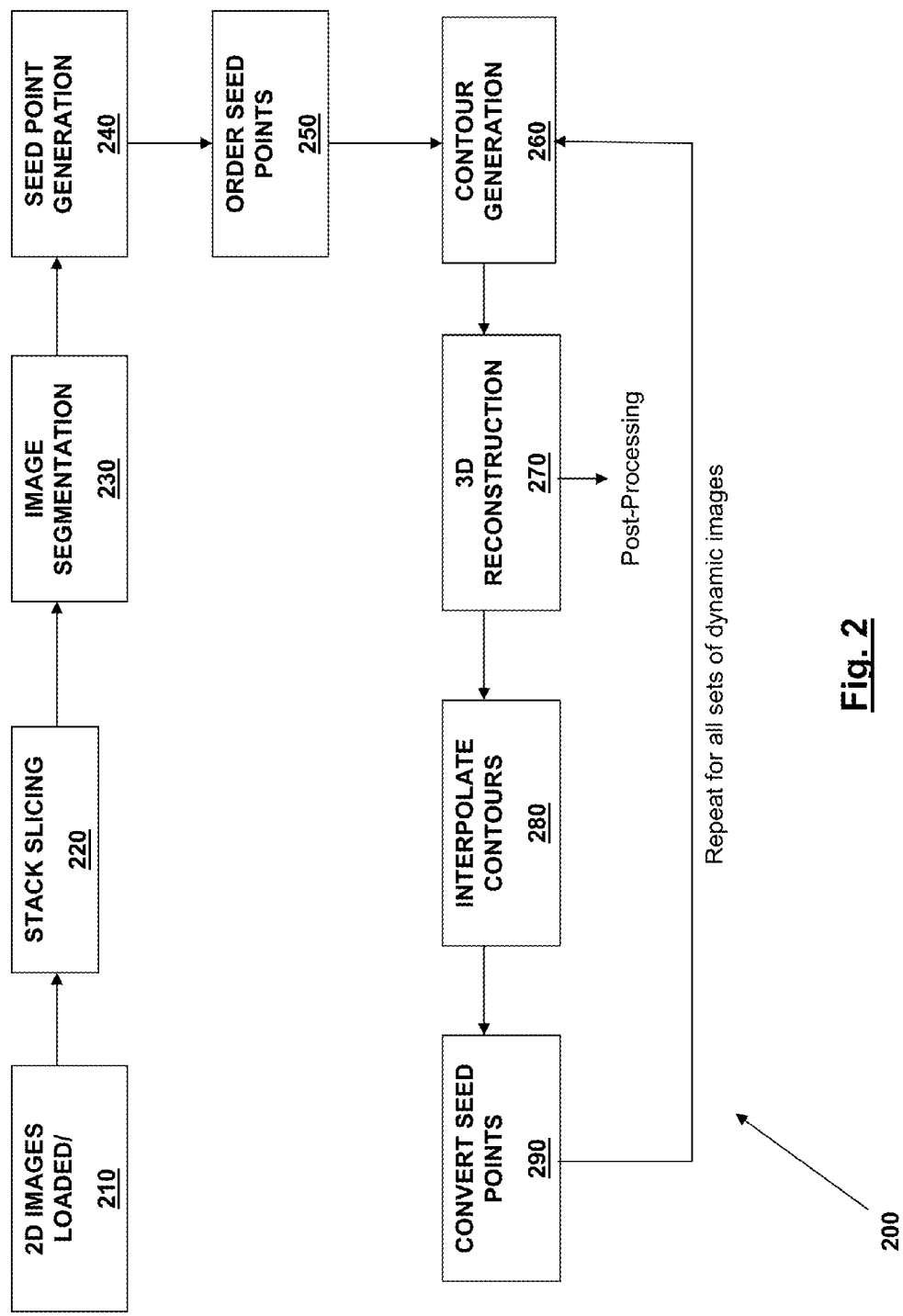
FIG. 2 depicts a flow diagram of a method of constructing a four-dimensional image in accordance with an illustrative embodiment.
Figure 3:
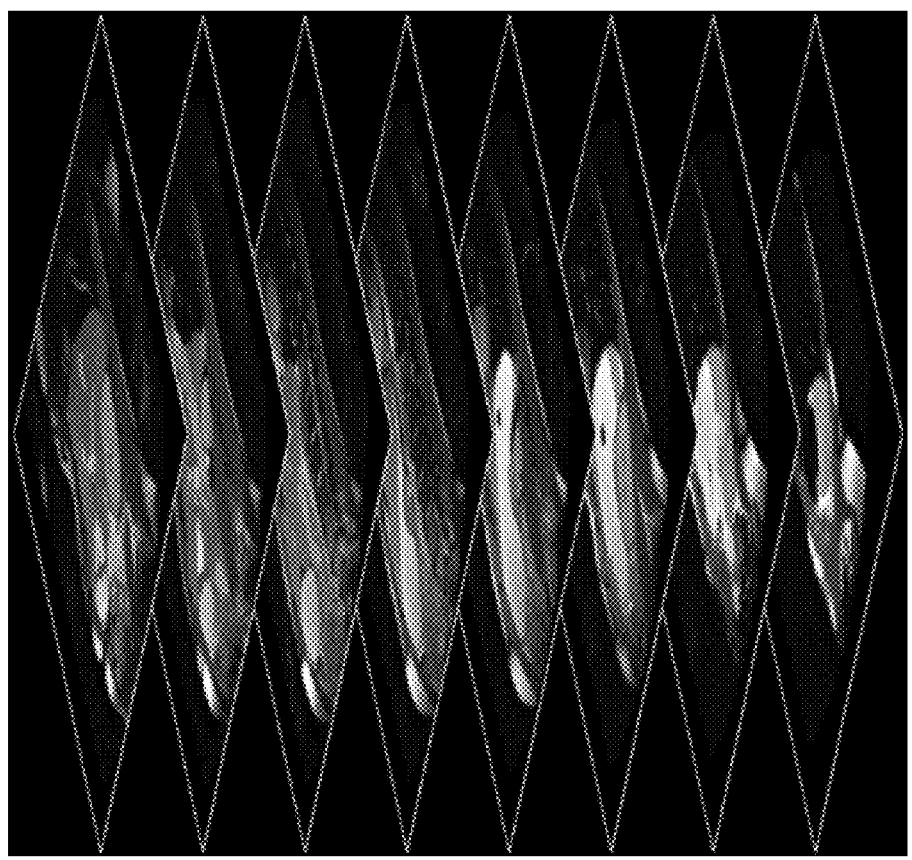
FIG. 3 depicts a screenshot of a 3-D stack of 2-D images in accordance with an illustrative embodiment.
Figure 3:
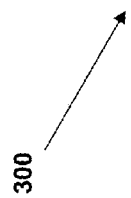

FIG. 2 depicts a flow diagram 200 of a method of constructing a four-dimensional (4-D) image in accordance with an illustrative embodiment. In an operation 210, a set of two-dimensional (2-D) images is loaded into the processor and stacked in three-dimensions. FIG. 3 depicts a screenshot 300 of a 3-D stack of 2-D images in accordance with an illustrative embodiment of operation 210. The stack of images used in FIG. 3 is from an MRI of an abdomen. In alternative embodiments, the set of 2-D images may be, but are not limited to X-ray images, ultrasonography images, or images obtained from any 2-D imaging device known to those of skill in the art.

Figure 4:
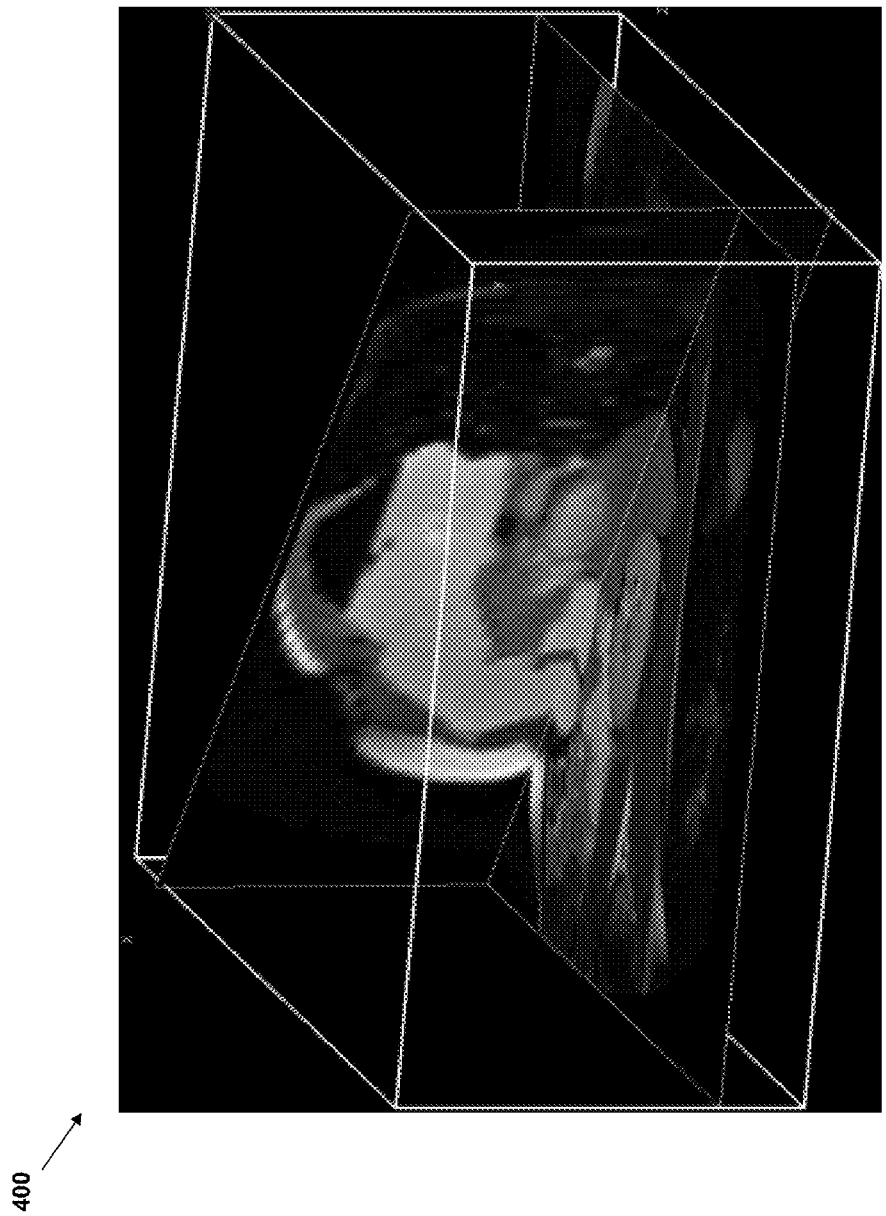
FIG. 4 depicts an image along a slicing plane in accordance with an illustrative embodiment.

In an operation 220, the 3-D stack of images is then sliced using an arbitrary flat plane such that the slicing plane intersects the object of interest in one or more images. The 3-D stack of images may be sliced in any arbitrary orientation, i.e., the 3-D stack of images may be sliced at any possible angle or in any possible orientation so long as the slicing plane is non-parallel to the individual images of the 3-D stack of images. In an embodiment, the slicing plane intersects the object in as many images as possible. In an embodiment, the processor is configured to receive various inputs that indicate three points on the 3-D stack of images. In a further embodiment, the three points are within a specific region of interest within the images and are selected such that a slicing plane that includes the three points will intersect the region of interest in as many images as possible. The processor is further configured to create the slicing plane so that it incorporates the three points and to automatically interpret the image data and obtain a new virtual image along the slicing plane. There is no restriction on how the slicing plane may be drawn, i.e., the slicing plane may be orthogonal or non-orthogonal to the original 2-D images. FIG. 4 depicts an image 400 along a slicing plane in accordance with an illustrative embodiment.

Figure 5:
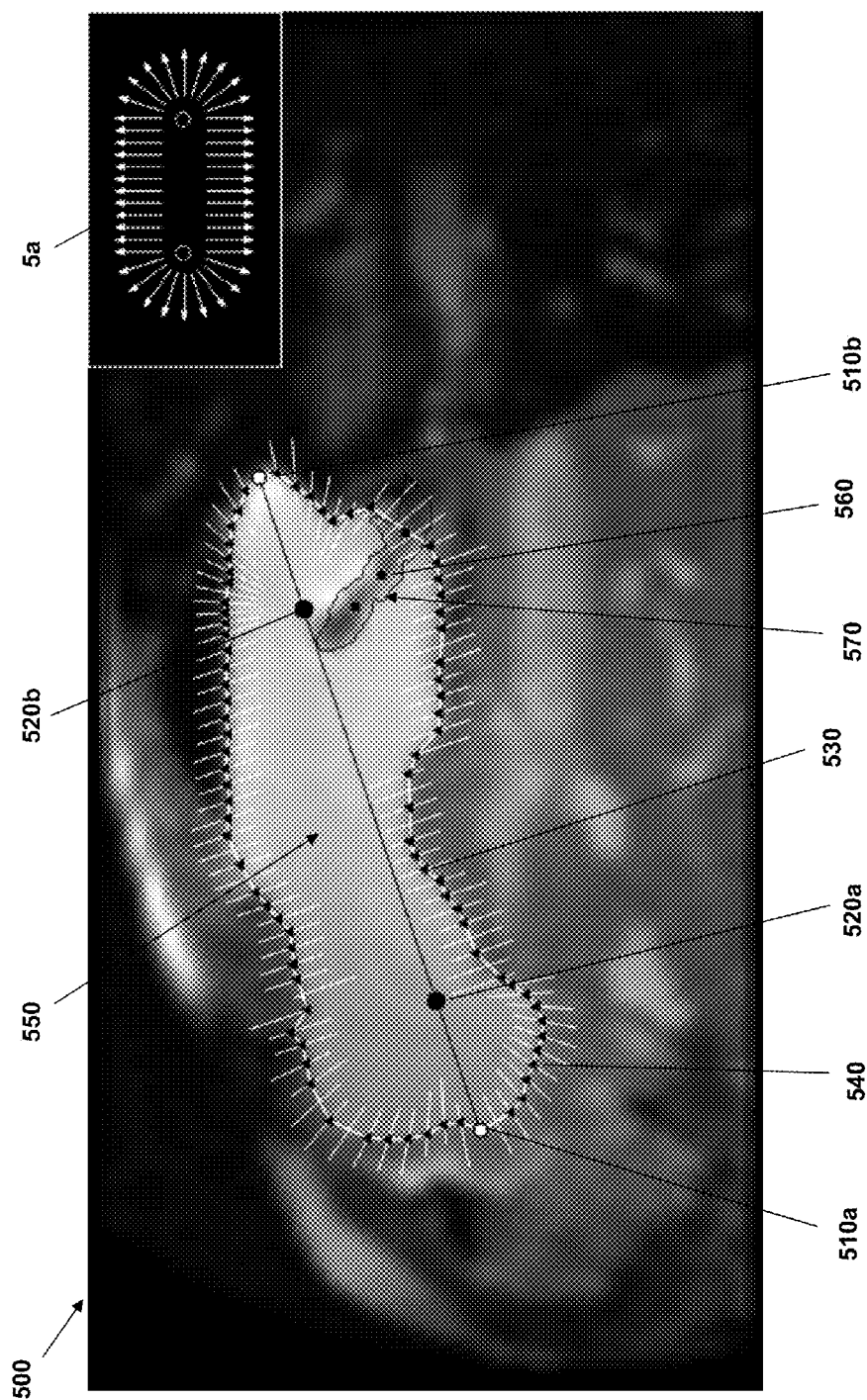
FIG. 5 depicts a screenshot of a graphical user interface corresponding to the radial search technique in accordance with an illustrative embodiment.

In an operation 230, the virtual image (corresponding to the slicing plane formed through the 3-D stack of images) is segmented using a radial search technique as described below. FIG. 5 depicts a graphical user interface 500 corresponding to the radial search technique in accordance with an illustrative embodiment. Graphical user interface 500 includes a chosen region of interest 550 that is to be segmented from the virtual image. According to the radial search technique, the processor receives an input identifying two points 510a, 510b on opposite ends of an approximate largest diameter of the region of interest. The approximate largest diameter need not be the absolute largest diameter. Points 510a, 510b are used to generate foci 520a, 520b at a predetermined distance from each end of a straight line joining points 510a, 510b. In an embodiment, foci 520a, 520b are a distance from each end equal to twenty percent of the total distance of the line joining points 510a, 510b. In alternative embodiments, the distance of foci 520a, 520 from points 510a, 510b may be different than twenty percent. For example, if the chosen region of interest 550 is highly elliptical, foci 520a, 520b should be nearer to points 510a, 510b, and if the chosen region of interest 550 is more circular, foci 520a, 520b may be farther from points 510a, 510b.

Radii are cast from foci 520a, 520b as depicted in inset 5a (i.e., the inset in FIG. 5). The processor determines whether the region of interest along the radii is brighter or darker than the surrounding areas based on the direction of an intensity gradient in order to identify edges of the region of interest.

Prior to edge detection, the processor calculates the intensity gradient at points 510a, 510b, where I(x,y) represents the intensity of a pixel at a location (x,y), and determines if the region of interest is brighter or darker than the surrounding areas based on the direction of the intensity gradient. The intensity gradient is calculated using second order central differencing, i.e., for a pixel (i,j) the intensity gradient is $\vec{\nabla} I_{i,j} = \frac{1}{2}(I_{i+1,j} - I_{i-1,j}), \frac{1}{2}(I_{i,j+1} - I_{i,j-1})$. Accordingly, the magnitude of the intensity gradient is $|\vec{\nabla} I_{i,j}| = \frac{1}{2}\sqrt{(I_{i-1,j} - I_{i-1,j})^2 + (I_{i,j-1} - I_{i,j-1})^2}$ and the direction unit of the vector is $$\vec{e} = \frac{\vec{\nabla} I_{i,j}}{|\vec{\nabla} I_{i,j}|}.$$

The processor is further configured to identify edge points 530 along each of the radii based on the following criteria:

$\vec{R} \cdot \vec{\nabla} I < 0$ for points brighter than the region of interest;

$\vec{R} \cdot \vec{\nabla} I > 0$ for points darker than the region of interest; and $|\vec{\nabla} I|_{max} \geq G_{threshold}$;

where $\vec{R}$ is the outward radius vector; and $G_{threshold}$ is the threshold magnitude of the intensity gradient, which is typically 70% of the magnitude of intensity gradient of the last edge point, i.e., the system assumes that the strength of the edge (quantified by the magnitude of the intensity gradient) varies a maximum of 30% between two edge points. In alternative embodiments, the threshold magnitude of the intensity gradient may be lowered below or raised above 70%. Lowering the threshold below 70% will allow more edge points to be detected with larger variations in the intensity gradient along edge. Conversely, raising the threshold above 70% will allow fewer edge points to be detected having small variations in the intensity gradient along the edge. If these edge detection criteria are not satisfied no edge points are detected by the processor along the respective radius. To avoid detecting the edges of other organs or areas having a similar intensity gradient, the search along each radius is limited and is dynamically updated depending on the last identified edge point as described below.

Black triangles 540 show the edge points detected by the radial search. The lack of a black triangle 540 along a radius indicates that the edge detection criteria were not satisfied at any point along that radius. The location of each radius also illustrates the results of the dynamic update procedure for the radius positioning based on the last detected edge. In the absence of such a dynamic update procedure for radius positioning, the radii would form an oblong shape as shown in insert 5a. The dynamic update procedure modifies the search criteria for subsequent edge points based on information about a presently discovered edge point, thus allowing the system to more closely approximate the true edge of region of interest 550. For example, following a radial search as described above for an $i^{th}$ edge point that is within the span of $$\vec{R}_i - \frac{\nabla \vec{r}}{2}$$

and $$\vec{R}_i + \frac{\nabla \vec{r}}{2},$$

wherein the edge point is found at $\vec{R}_i + \delta \vec{r}$, the search criteria are updated for the next edge point radial search such that the search span will be between $$\vec{R}_{i+1} - \frac{\nabla \vec{r}}{2}$$

and $$\vec{R}_{i+1} + \frac{\nabla \vec{r}}{2}$$

wherein $\vec{R}_{i+1} = \vec{R}_i + \delta \vec{r}$, and wherein $\nabla \vec{r}$ is the span within which an edge point is searched according to the following criteria as described above:

$\vec{R} \cdot \vec{\nabla} I < 0$ for points brighter than the region of interest;

$\vec{R} \cdot \vec{\nabla} I > 0$ for points darker than the region of interest.

Noise in the image may be present due to a poor signal to noise ratio, which is often associated with dynamic magnetic resonance images. Because the calculation of the intensity gradient may be susceptible to noise present in the image, the processor may utilize a filter to filter excess noise from the image as known to those of skill in the art. In the embodiment depicted in FIG. 5, a 3×3 Gaussian filter was applied to the virtual magnetic resonance image to remove excess noise from the image. Larger filters such as 5×5, 7×7, etc. Gaussian filters may be used to address higher levels of noise. In addition, filters such as anisotropic diffusion filter or other filters known to those of skill in the art may also be used.

In an embodiment, an obstacle avoidance algorithm may be used to ignore undesired objects, e.g., a catheter inserted in an organ, within the region of interest during the detection of the edge points. According to such an embodiment, the processor is configured to receive an input corresponding to a selection of the undesired object corresponding to one or more points 560. Upon receiving a selection of one or more points 560 corresponding to the undesired object, the processor creates a circular radial search centered around points 560 using an algorithm similar to the one described above with respect to the detection of the edges of the region of interest. In this way, the edges of the object are detected. For example, area 570 of FIG. 5 corresponds to a catheter inserted into the stomach (to which the region of interest 550 corresponds). During the subsequent region of interest edge detection process, any detected edge point within the boundary of the undesired object is ignored.

After each edge point 540 that satisfies the edge detection criteria has been identified, a contour around the region of interest 550 may be designated by connecting adjacent edge points.

In an alternative embodiment, the radial search technique described with respect to operation 230 may not function properly if a portion of the region of interest is darker than the surrounding area and another portion of the region of interest is brighter than the surrounding area or if the diameter line does not remain completely within the region of interest. For example, this may be the case when the shape of the region of interest is twisted. According to such an embodiment, the processor is configured to receive an input from a sketch tool that allows the user to draw the edge of the region of interest as enabled by the live-wire algorithm discussed below and as known to those of skill in the art.

Figure 6:
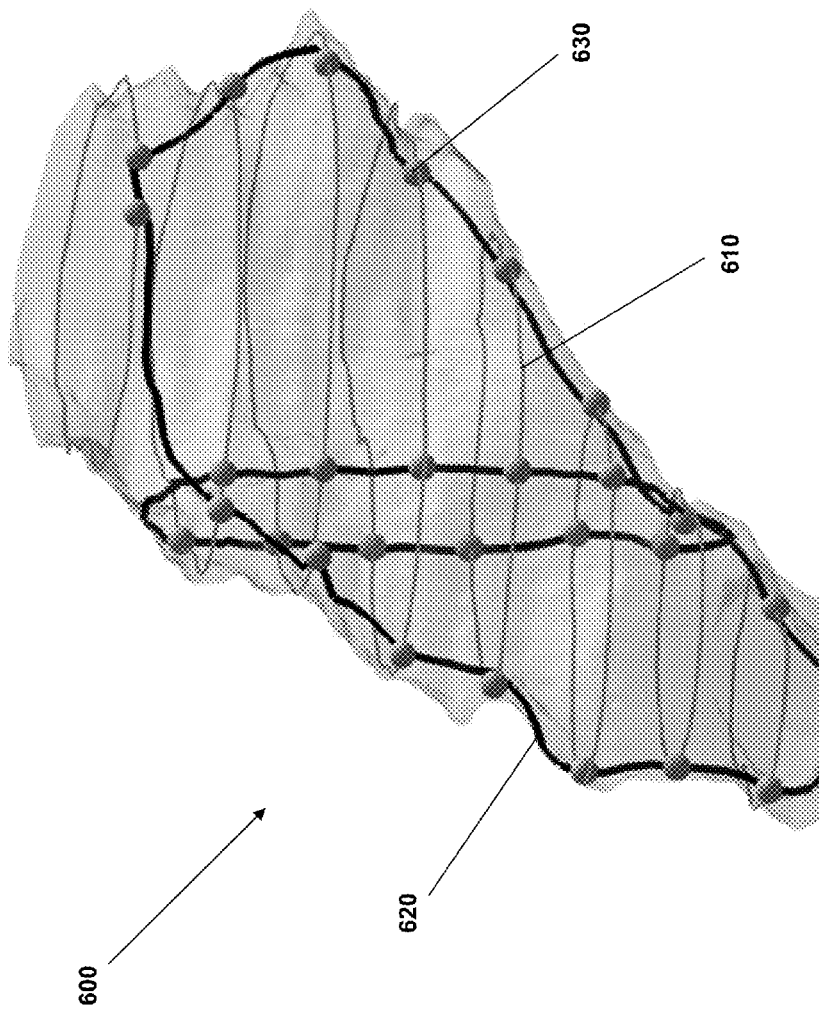
FIG. 6 depicts seed points in a 3-D reconstruction of a region of interest in accordance with an illustrative embodiment.

In an operation 240, seed points are generated as described below. The contour generated from the edge points of the region of interest in the sliced virtual image will intersect the original image planes in at least two intersection points. These intersection points, which are on the edge of the region of interest, are used as seed points for contour generation on the original images. FIG. 6 depicts such seed points 630 in a 3-D reconstruction 600 of a region of interest in accordance with an illustrative embodiment.

3-D reconstruction 600 includes one or more stacked, original 2-D image contours 610. Edges 620 depict the edges of region of interest 550 generated during the edge detection process of operation 230 performed on the resliced virtual image. Multiple seed points 630 are generated in operation 240 at the intersection of respective original 2-D image contours 610 and respective edges 620 which depict the edges of the region of interest. In the embodiment depicted in FIG. 6, two edges 620 from two resliced images are shown which resulted in between two and four seed points 630 in each original 2-D image contour 610. Thus, if there are 40 images and a resliced plane intersects the region of interest in all images, an edge detection process in one resliced plane will generate a minimum of 80 seed points in the original 2-D images. Similarly three such resliced planes will create at least six seed points on each of the original 2-D images, resulting in a total of 240 seed points based on six separate inputs from a user selecting the edges of the three region of interests. Using these seed points contours of the region of interest can be automatically generated as described below.

Figure 7:
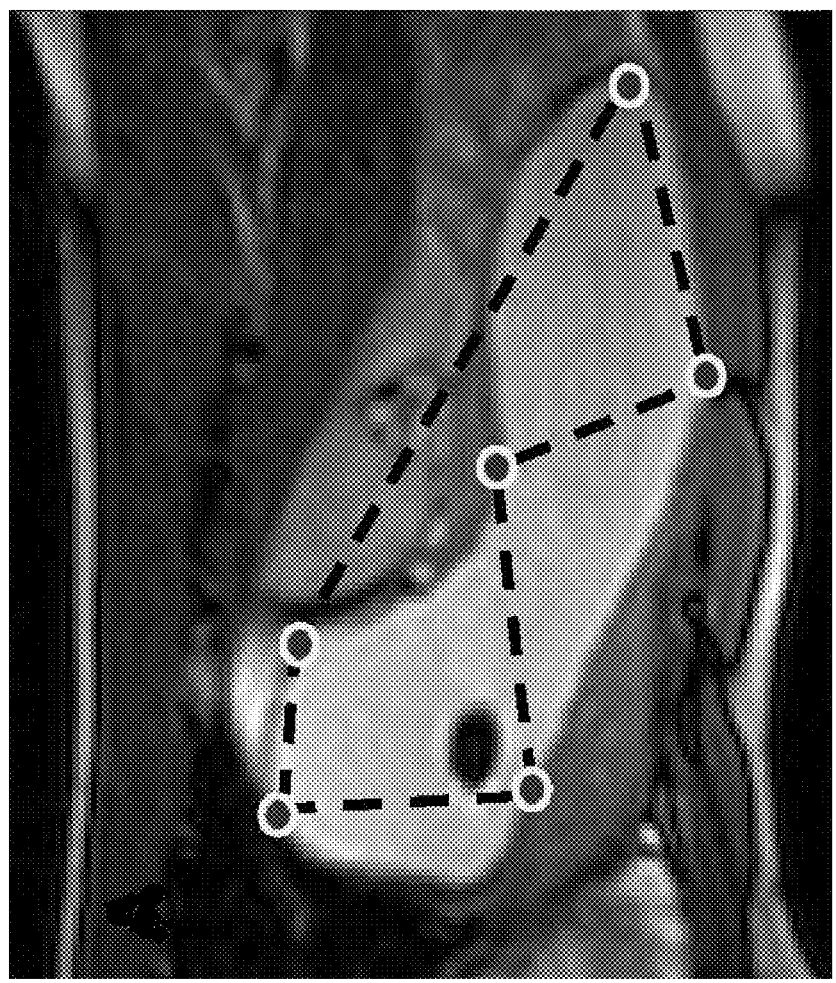
FIG. 7 depicts a region of interest in which seed points are incorrectly linked in accordance with an illustrative embodiment.
Figure 8:
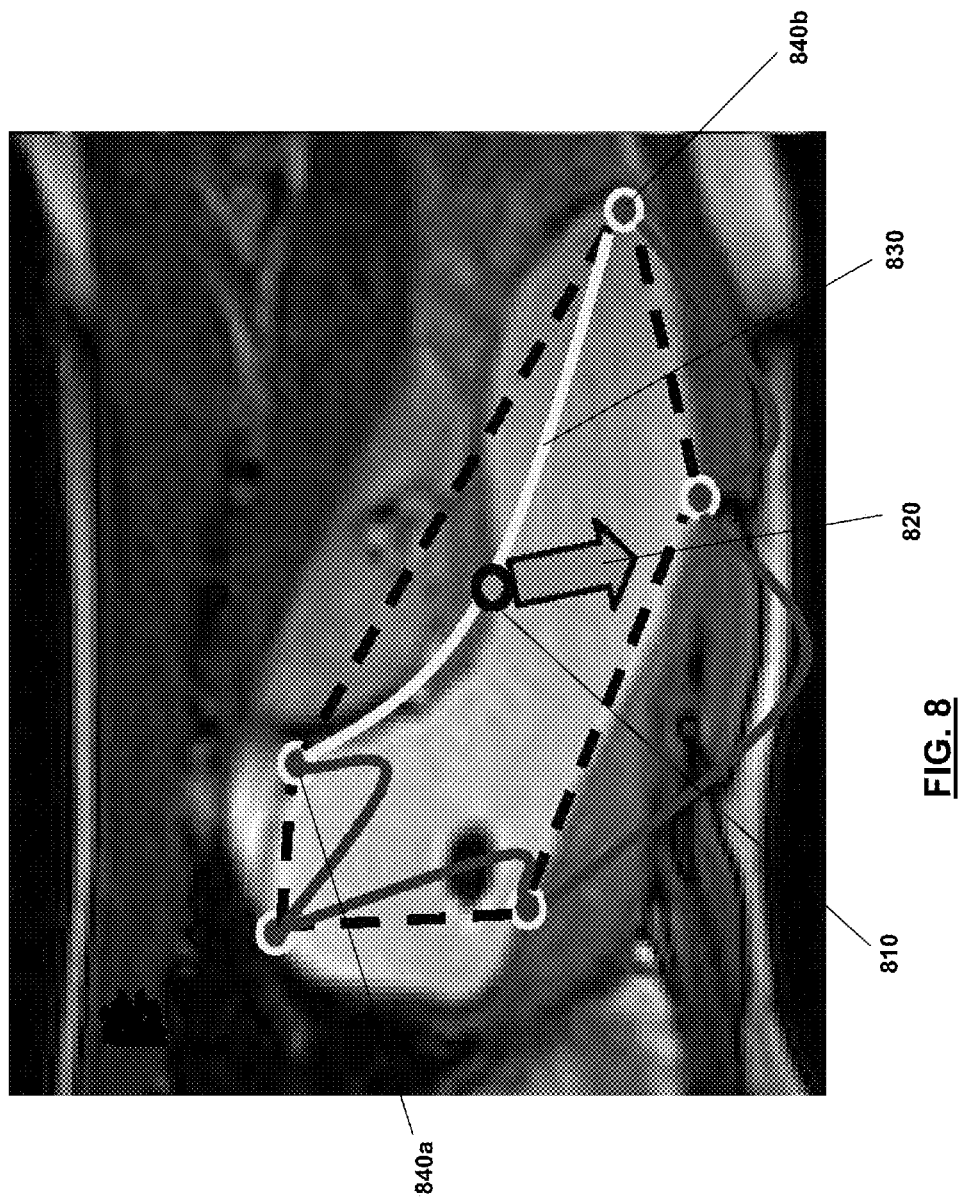
FIG. 8 depicts a region of interest in which a "magnetic" linking processing is used to link the seed points in accordance with an illustrative embodiment.

In an operation 250, the seed points are ordered according to a "magnetic" linking process as described below. Proper ordering of the seed points prior to contour generation may be complicated by the potentially complex geometry of the region of interest. For example, if a region of interest is concave, there may be multiple possible ways to connect the seed points to form a closed polygon that do not conform to the actual edge of the region of interest underlying the seed points as depicted in FIG. 7. Therefore to automatically achieve the correct linking procedure, a "magnetic" linking process is utilized. According to the "magnetic" linking process, a convex hull is passed through the seed points as shown by the black dashed lines in FIG. 8. The points which are left out (e.g., point 810) following fitting of the convex hull now act as artificial magnets where they exert forces on the sides of the convex hull. The direction of the force is given by the direction of the vector $-f\vec{\nabla}I$ as shown by arrow 820 in FIG. 8. From the artificial magnetic point the gradient of image intensity for all the points on which the black dotted line in FIG. 8 is determined. A scalar "f" is defined as:

f=−1, if the region of interest is brighter than the given point;

f=1, if the region of interest is darker than the given point; and f=0, if there is a mixed region of interest, i.e., the region of interest includes both brighter and darker areas than the given point. A mixed region of interest may occur for an internal organ that includes both liquid and gaseous phases that exist simultaneously.

Figure 9:
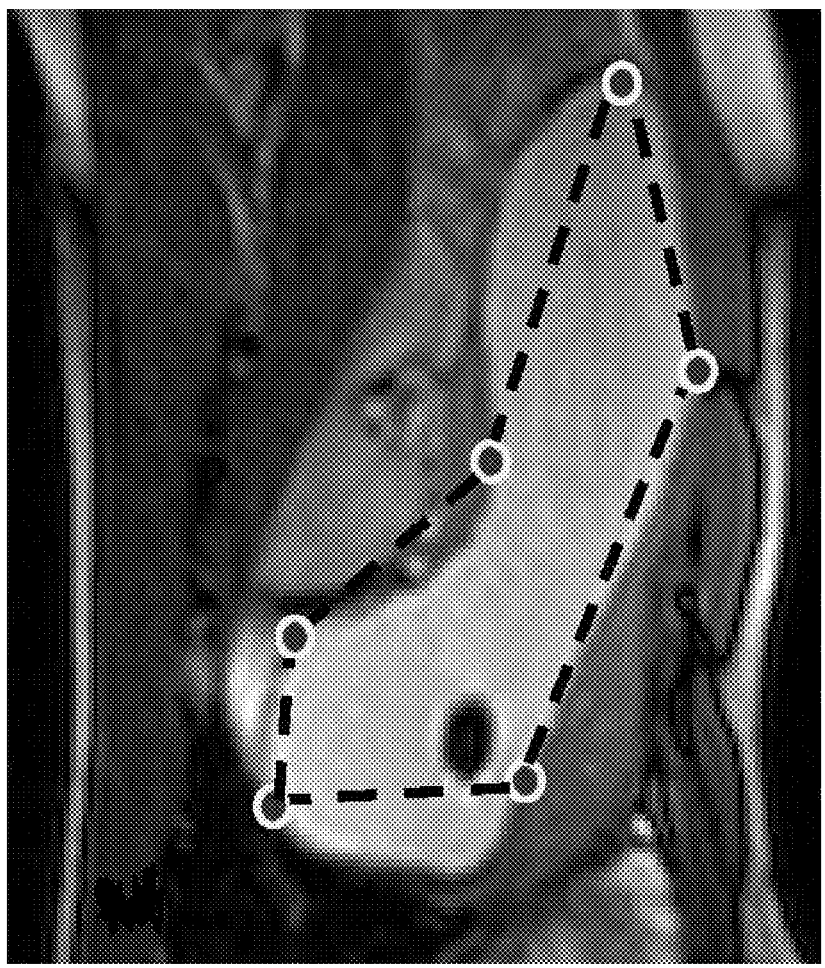
FIG. 9 depicts a region of interest in which the seed points are correctly linked in accordance with an illustrative embodiment.

The quantity $-f\vec{\nabla}I$ represents the force with which the magnet point attracts all the points on the dotted line. Under this force the sides of the convex hull deform and eventually one of the sides (e.g., side 830 in FIG. 8) reaches the magnetic seed point 810 before the other points. The two end points 840a, 840b of this side are then linked with the magnetic seed point 810. This procedure is repeated until all seed points are properly linked. FIG. 9 depicts the same region of interest as in FIG. 8 in which the seed points are correctly linked in accordance with an illustrative embodiment.

When the region of interest is mixed as described above, i.e., f=0, the magnetic linking methodology does not work. In an embodiment, upon encountering a mixed region of interest, the centroid of the convex hull polygon is calculated and, with respect to the centroid, the angular orientation of each seed point is obtained. The centroid of the convex hull polygon is calculated by averaging the coordinate positions of the vertex points of the convex hull for each portion of the region of interest.

The seed points are then linked by sorting them according to their angular orientation. For convex polygons, the centroid lies inside the polygon. Accordingly, if each of the vertices is joined to the centroid by respective straight lines, then these straight lines will generate different angles with respect to a fixed line, e.g., the positive x-axis, on the image plane. The vertices/seed points are sorted based on the ascending order of these angles. Should the angular orientation methodology fail to correctly link the seed points, the user can also manually link the seed points using a set of interactive tools of a graphical user interface provided by the processor.

In an operation 260, the contour of the region of interest is generated on the original 2-D images as described below. Using the seed points as ordered in operation 250, a minimum cost path between the seed points is determined by the processor using the live-wire algorithm as known to those of skill in the art. The cost of the path is determined from image features such as gradient magnitude, laplacian zero crossing, edge direction, etc. The minimum cost path gives the final contour on each original 2-D image containing at least part of the region of interest. In an embodiment, the entire contour generation process is completely automated and does not require any user intervention. In alternative embodiments, the processor is configured to receive inputs from the user to manually change the contour generated by the processor. In addition, the processor is configured to receive inputs from the user to control the parameters of the live-wire algorithm. For example, if the object of interest is very clearly distinguishable from the background but the object of interest has very intricate shapes, the user may configure the system to give higher priority to edge direction and lower priority to determination of the intensity gradient magnitude. Conversely, if the distinction between the edge of the object of interest and the background is low, the system may be configured to give greater priority/weight to the determination of the intensity gradient magnitude rather than the direction of the edge.

In an operation 270, 3-D reconstruction is performed as described below. The processor is configured to locate points lying in the 3-D surface of the region of interest that is to be reconstructed. In an embodiment, the system may be configured to receive inputs from the user regarding the number of points to be used to reconstruct the image, with the upper limit being the total number of pixels of the image. Smaller numbers of points reduces the surface complexity and resolution of the image.

The surface region is determined by finding a non-common region between two adjacent contours of the region of interest. The non-common region is a region that is encircled by one but not both of the two adjacent contours of the region of interest. The non-common region can be determined using the following mathematical functions, for a pair of contours $C_1$ and $C_2$, wherein i=1, 2:

$O_{Ci}(x,y)=-1$, if (x,y) is inside of $C_i$;
$O_{Ci}(x,y)=1$, if (x,y) is outside of $C_i$; and
$O_{Ci}(x,y)=0$, if (x,y) is on C.

Figure 10:
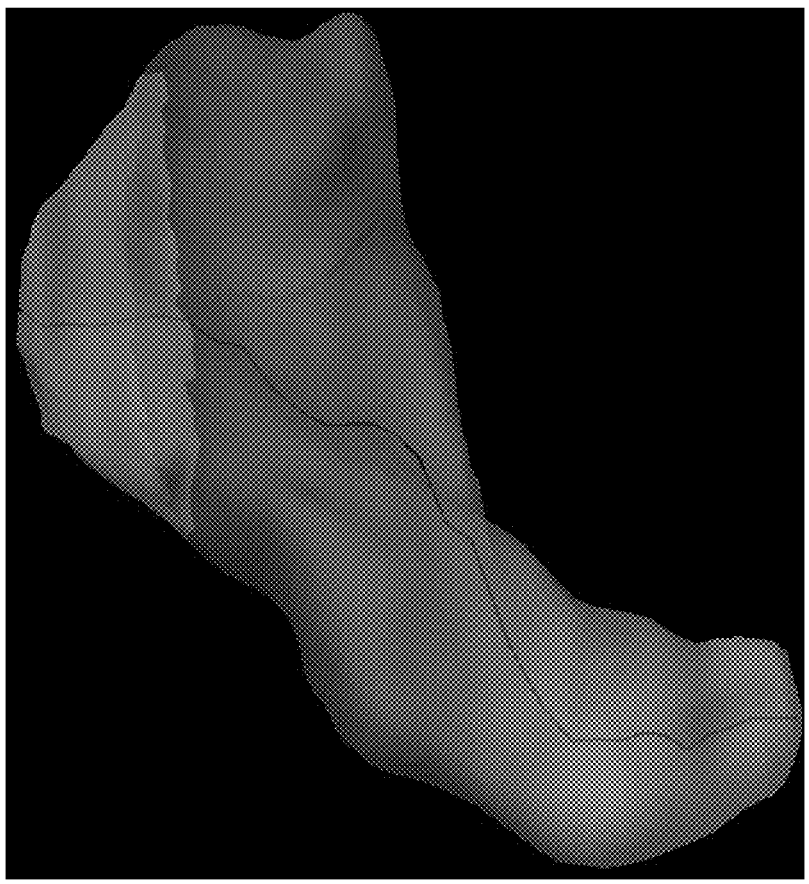
FIG. 10 depicts a 3-D reconstruction of a region of interest in accordance with an illustrative embodiment.

Using this function, the surface region can be defined by a set of points (x,y) such that $O_{C1}(x,y)*O_{C2}(x,y)\leq 0$, which would consist of the set of points lying in the non-common region. FIG. 10 depicts a 3-D reconstruction of a region of interest in accordance with an illustrative embodiment.

In an embodiment, after performing the 3-D reconstruction, quantitative information about the structural geometry of the region of interest (e.g., surface area and volume) can be obtained by the processor by measuring the region of interest. In alternative embodiments, customized data regarding the region of interest may be obtained as known to those of skill in the art. The customized data may include a total or partial volume such as the volume of air or liquid, a surface area, a surface curvature, a location of a diagnostic apparatus with respect to an anatomical structure, etc.

Figure 11:
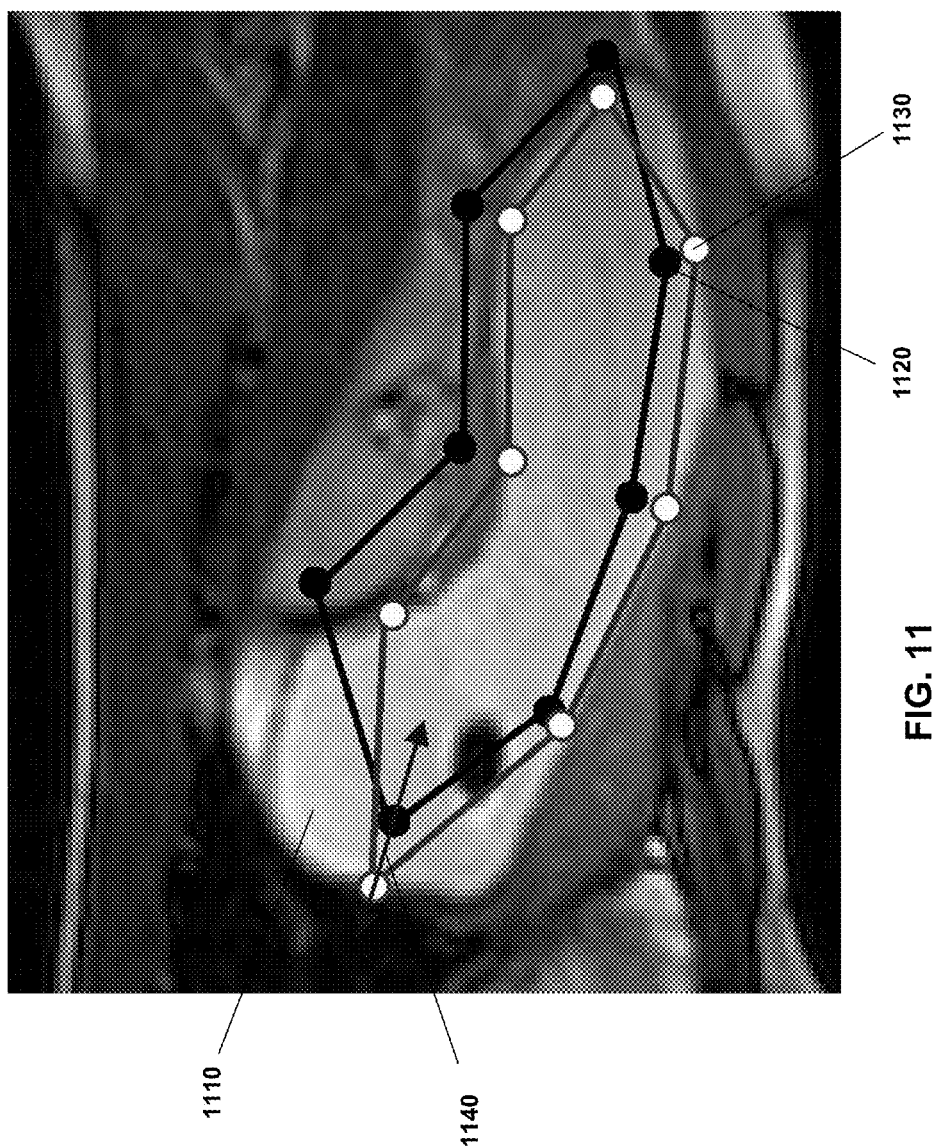
FIG. 11 depicts a region of interest in which the interpolated seed points of a previous set of images are fitted to the edges of the current region of interest in accordance with an illustrative embodiment.

In an operation 280, the segmented contours of the region of interest for the current set of images are copied and interpolated for a subsequent set of images as described below. The analysis of the subsequent set of images allows for a four-dimensional (4-D) reconstruction of the region of interest. According to operation 280, the edge contours of images from the current set of images are copied to a next set of images with the approximation that the two sets have sufficient similarities so that the edge contours can be mapped from the current set of images to the next set of images as described below. From these contours 8-10 edge contour points are created by linear interpolation for the next set of images. According to such a linear interpolation procedure, the total number of points along the contour is reduced to 8-10 points which are evenly distributed throughout the length of the contour and joined by straight lines as illustrated in FIG. 11. In alternative embodiments, the total number of points may be fewer than 8 or greater than 10 depending on the desired accuracy and complexity of the final image and the complexity of the region of interest.

In an operation 290, the interpolated contour points from the previous set of images (i.e., the "current" set of images from operation 280) are converted to seed points for the present set of images (i.e., the "next" set of images from operation 280) by fitting the interpolated contour points to the edges of the region of interest in the present set of images as described further below. FIG. 11 depicts a region of interest in which interpolated seed points 1120 from the previous set of images are fitted to the edges of the current region of interest from the present set of images to form current seed points 1130 in accordance with an illustrative embodiment. Interpolated seed points 1120 are seed points from the region of interest of the previous set of images which do not lie along the edge of the current region of interest in the present set of images. The processor is configured to search along an equal bisector 1140 to determine the edge of the current region of interest and to relocate interpolated seed points 1120 to the edge of the current region of interest. Seed points 1120 along the contour are connected with neighboring points by straight lines. Unit vectors along these lines specify corresponding direction of the lines. The resultant of these unit vectors will give the direction of the corresponding equal bisector 1140 of the included angle.

The edge of the current region of interest is determined by the processor by comparing the intensity gradient magnitude and the direction of the image intensity of the current region of interest to the region of interest from the previous set of images. In addition, a cross-correlation of a box of pixels from the region of interest from the previous set of images is calculated with respect to a similar box of pixels in the current region of interest. The combination of these three factors allows accurate positioning of these points on the edge which are then used as seed points for segmentation. For example, according to an embodiment point $(x_0,y_0)$ is tracked to a new position $(x^*,y^*)$ by correlating the pixels within a box of size 2N, i.e., within $x_0-N \leq x^* \leq x_0+N$ and $y_0-N \leq y^* \leq y_0-N$. The intensity of the pixels within a $(2N+1)\times(2N+1)$ box surrounding the point $(x_0,y_0)$ in the reference image is $I_0(x,y)$, and the intensity of the pixels in the current image is $I^*(x,y)$. The cross-correlation coefficient between these two boxes of pixels is calculated using the following equation:

$$C = \frac{\sum_{x=-N}^{N}\sum_{y=-N}^{N}(I_0(x+x,y+y_0)-\bar{I}_o)(I^*(x+x^*,y+y^*)-\bar{I}^*)}{\sqrt{\sum_{x=x_0-N}^{x_0+N}\sum_{y=y_0-N}^{y_0+N}(I_0(x,y)-\bar{I}_o)^2 \sum_{x=x^*-N}^{x^*+N}\sum_{y=y^*-N}^{y^*+N}(I^*(x,y)-\bar{I}^*)^2}},$$

where $\bar{I}_0$ and $\bar{I}_*$ are the average pixel intensities of the pixels within the $(2N+1)\times(2N+1)$ box. For a point located at $(x_0,y_0)$ in the reference frame, the correlation coefficient C is calculated for all points $(x^*,y^*)$. The function $g=\sin(\vec{\nabla} I_0, \vec{\nabla} I^*)C)$ is calculated, wherein the highest value of this function is located within $x_0-N \leq x^* \leq x \leq x_0+N$ and $y_0-N \leq y^* \leq y_0+N$ in the current frame. The point where g is highest is chosen as the new location $(x^*,y^*)$ of the point $(x_0,y_0)$ in the current image.

In an embodiment, when the similarity between the current region of interest and the region of interest from the previous set of images drops such that the coefficient of cross-correlation is less the 0.5, the processor is configured to cause a warning to be displayed that alerts the user to check if the automatic segmentation procedure generated the appropriate contours for the current region of interest in the present set of images.

After the seed points for the current region of interest in the present set of images are determined in operation 290, contour generation and 3-D reconstruction for the current region of interest may be performed as described above with respect to operations 260 and 270. In addition, operations 260, 270, 280, and 290 may be repeated for any number of subsequent sets of images. In this manner, changes to the region of interest over a given period of time may be imaged and may thus provide a 4-D reconstruction of the region of interest.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus comprising:
   an interface configured to:
      receive a first input to slice a stack of two-dimensional images into one or more planes to form one or more virtual images in any arbitrary orientation, wherein the stack of two-dimensional images depicts an object of interest;
      receive a second input to segment the one or more virtual images; and
   a processor communicatively coupled to the interface, wherein the processor is configured to:
      generate a one or more seed points on the one or more virtual images based on the second input;
      automatically order the one or more seed points using a magnetic linking method;
      generate contours corresponding to the object of interest using a live-wire algorithm;
      perform a first three-dimensional construction of the object of interest based on the contours;
      convert the contours into seed points for a subsequent set of images after the generation of the contours corresponding to the object of interest; and
      perform a second three-dimensional construction of the object of interest corresponding to the subsequent set of images.

2. The apparatus of claim 1, wherein the first input comprises a selection of three points from the stack of two-dimensional images.

3. The apparatus of claim 2, wherein at least one of the one or more planes includes the three points.

4. The apparatus of claim 2, wherein the two-dimensional images are arranged parallel to each other, and wherein at least one of the one or more planes is non-orthogonal to the two-dimensional images.

5. The apparatus of claim 1, wherein the second input to segment the one or more virtual images comprises a selection of at least two points on a diameter across the object of interest, wherein the processor is further configured to generate foci at a predetermined distance from each end of the diameter and cast radii to search for edges of the object of interest, and wherein the edges of the object of interest are determined based on a threshold intensity gradient value that indicates if surrounding areas are a threshold percentage brighter or darker than the at least two points on the diameter.

6. The apparatus of claim 1, wherein the interface is further configured to receive a third input configured to identify an undesired object, and wherein the processor is further configured to ignore the undesired objected during the generation of one or more seed points and the generation of the contours.

7. The apparatus of claim 1, wherein the one or more seed points comprise intersections of the one or more planes with the respective images of the stack of two-dimensional images.

8. The apparatus of claim 7, wherein the stack of two-dimensional images comprises n images, and wherein the one or more seed points comprise $2n$ seed points.

9. The apparatus of claim 1, wherein processor is further configured to automatically order the one or more seed points by forming a maximal convex polygon from the one or more seed points and proportionally deforming edges of the maximal convex polygon with respect to an interior seed point until all of the one or more seed are linked.

10. The apparatus of claim 1, wherein the processor is further configured to convert the contours into seed points for a subsequent set of images by:
    placing the one or more seed points onto the subsequent set of images; and
    relocating the one or more seed points to the edge of the object of interest depicted in the subsequent set of images by matching a gradient magnitude and image intensity of the of the one or more seed points with points within the subsequent set of images.

11. A method comprising:
    receiving, at an interface, a first input to slice a stack of two-dimensional images into one or more planes to form one or more virtual images in any arbitrary orientation, wherein the stack of two-dimensional images depicts an object of interest;
    receiving, at the interface, a second input to segment the one or more virtual images;
    generating, by a processor, a one or more seed points on the one or more virtual images based on the second input;
    automatically ordering, by the processor, the one or more seed points using a magnetic linking method;
    generating, by the processor, contours corresponding to the object of interest using a live- wire algorithm;
    performing, by the processor, a first three-dimensional construction of the object of interest based on the contours;
    converting, by the processor, the contours into seed points for a subsequent set of images after the generating the contours corresponding to the object of interest; and
    performing, by the processor, a second three-dimensional construction of the object of interest corresponding to the subsequent set of images.

12. The method of claim 11, wherein the receiving an input comprises receiving a selection of three points from the stack of two-dimensional images, and wherein at least one of the one or more planes includes the three points.

13. The method of claim 11, wherein the second input to segment the one or more virtual images comprises a selection of at least two points on a diameter across the object of interest, the method further comprising generating foci at a predetermined distance from each end of the diameter and casting radii to search for edges of the object of interest, wherein the edges of the object of interest are determined based on a threshold intensity gradient value that indicates if surrounding areas are a threshold percentage brighter or darker than the at least two points.

14. The method of claim 11, further comprising receiving a third input configured to identify an undesired object; and ignoring the undesired objected during the generating one or more seed points step and the generating contours step.

15. The method of claim 11, wherein the one or more seed points comprise intersections of the one or more planes with the respective images of the stack of two- dimensional images.

16. The method of claim 11, wherein the automatically ordering the one or more seed points comprises:
    forming a maximal convex polygon from the one or more seed points; and
    proportionally deforming edges of the maximal convex polygon with respect to an interior seed point until all of the one or more seed are linked.

17. The method of claim 11, wherein the converting the contours into seed points for a subsequent set of images comprises:
    placing the one or more seed points onto the subsequent set of images; and
    relocating the one or more seed points to the edge of the object of interest depicted in the subsequent set of images by matching a gradient magnitude and image intensity of the of the one or more seed points with points within the subsequent set of images.

18. An article of manufacture including a tangible non-transitory computer-readable medium having instructions stored thereon that, if executed by a computing device, cause the computing device to perform operations comprising:
    receiving a first input to slice a stack of two-dimensional images into one or more planes to form one or more virtual images in any arbitrary orientation, wherein the stack of two-dimensional images depicts an object of interest;
    receiving a second input to segment the one or more virtual images;
    generating one or more seed points on the one or more virtual images based on the second input;
    automatically ordering the one or more seed points using a magnetic linking method;
    generating contours corresponding to the object of interest using a livewire algorithm;
    performing a first three-dimensional construction of the object of interest based on the contours;
    converting the contours into seed points for a subsequent set of images after the generating the contours corresponding to the object of interest; and
    performing a second three-dimensional construction of the object of interest corresponding to the subsequent set of images.

19. The article of manufacture of claim 18, wherein the second input to segment the one or more virtual images comprises a selection of at least two points on a diameter across the object of interest, the tangible computer-readable medium having further instructions stored thereon, that if executed by a computing device, cause the computing device to perform operations further comprising generating foci at a predetermined distance from each end of the diameter and casting radii to search for edges of the object of interest, wherein the edges of the object of interest are determined based on a threshold intensity gradient value that indicates if surrounding areas are a threshold percentage brighter or darker than the at least two points.

20. The article of manufacture of claim 18, wherein the one or more seed points comprise intersections of the one or more planes with the respective images of the stack of two-dimensional images, wherein the automatically ordering the one or more seed points comprises forming a maximal convex polygon from the one or more seed points and proportionally deforming edges of the maximal convex polygon with respect to an interior seed point until all of the one or more seed are linked; and wherein the converting the contours into seed points for a subsequent set of images comprises placing the one or more seed points onto the subsequent set of images and relocating the one or more seed points to the edge of the object of interest depicted in the subsequent set of images by matching a gradient magnitude and image intensity of the of the one or more seed points with points within the subsequent set of images.

* * * * *

UNITED STATES PATENT AND TRADEMARK OFFICE
CERTIFICATE OF CORRECTION

PATENT NO.        : 8,463,021 B2
APPLICATION NO.   : 12/883649
DATED             : June 11, 2013
INVENTOR(S)       : Pal et al.

It is certified that error appears in the above-identified patent and that said Letters Patent is hereby corrected as shown below:

On the Title Page, item (56), under "OTHER PUBLICATIONS", in Column 2, Line 1, delete "al." and insert -- al., --, therefor.

On Title Page 2, item (56), under "OTHER PUBLICATIONS", in Column 1, Line 4, delete "Cars,"" and insert -- analysis," --, therefor.

On Title Page 2, item (56), under "OTHER PUBLICATIONS", in Column 1, Line 6, delete "Image" and insert -- Models and Image --, therefor.

In the Specifications:

In Column 5, Line 11, delete "$\sqrt{(I_{i-1,j}-I_{i-1,j})^2 + (I_{i,j-1}-I_{i,j-1})^2}$" and insert -- $\sqrt{(I_{i+1,j}-I_{i-1,j})^2 + (I_{i,j+1}-I_{i,j-1})^2}$ --, therefor.

In Column 9, Line 6, delete "C." and insert -- $C_i$. --, therefor.

In Column 10, Line 11, delete "$y_0 - N \leqq y^* \leqq y_0 - N.$" and insert -- $y_0 - N \leqq y^* \leqq y_0 + N.$ --, therefor.

In Column 10, Line 30, delete "$g = \sin(\vec{\nabla} I_o \vec{\nabla} I^*) C)$" and insert -- $g = \sin(\vec{\nabla} I_o \vec{\nabla} I^*) C$ --, therefor.

Signed and Sealed this
Eighth Day of October, 2013

Teresa Stanek Rea
*Deputy Director of the United States Patent and Trademark Office*

CERTIFICATE OF CORRECTION (continued)
U.S. Pat. No. 8,463,021 B2

In Column 10, Line 32, delete "$x_0-N \leqq x^* \leqq x \leqq x_0+N$," and insert -- $x_0-N \leqq x^* \leqq x_0+N$ --, therefor.

In the Claims:

In Column 13, Line 12, in Claim 10, delete "of the of the" and insert -- of the --, therefor.

In Column 14, Line 9, in Claim 17, delete "of the of the" and insert -- of the --, therefor.

In Column 14, Line 27, in Claim 18, delete "livewire" and insert -- live-wire --, therefor.

In Column 14, Line 62, in Claim 20, delete "of the of the" and insert -- of the --, therefor.